United States Patent
Hong

(10) Patent No.: US 11,963,229 B2
(45) Date of Patent: Apr. 16, 2024

(54) COMPETITIVE RANDOM ACCESS METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 438 days.

(21) Appl. No.: 17/288,745

(22) PCT Filed: Nov. 1, 2018

(86) PCT No.: PCT/CN2018/113410
§ 371 (c)(1),
(2) Date: Apr. 26, 2021

(87) PCT Pub. No.: WO2020/087440
PCT Pub. Date: May 7, 2020

(65) Prior Publication Data
US 2022/0124812 A1    Apr. 21, 2022

(51) Int. Cl.
*H04W 74/0833* (2024.01)

(52) U.S. Cl.
CPC ............... *H04W 74/0833* (2013.01)

(58) Field of Classification Search
None
See application file for complete search history.

(56) References Cited

U.S. PATENT DOCUMENTS

2018/0279375 A1* 9/2018 Jeon ............... H04W 72/23
2019/0132882 A1* 5/2019 Li ................... H04W 74/0833
2020/0107322 A1* 4/2020 Lunttila ........... H04W 74/0833
2020/0120713 A1* 4/2020 Yerramalli ....... H04W 74/0833
2020/0146069 A1* 5/2020 Chen ............... H04W 52/362

(Continued)

FOREIGN PATENT DOCUMENTS

| CN | 108271275 A | 7/2018 | |
|---|---|---|---|
| WO | WO 2017136458 A2 | 8/2017 | |
| WO | WO-2020034319 A1 * | 2/2020 | .......... H04W 74/002 |

OTHER PUBLICATIONS

Indian Patent Application No. 202147022161, Office Action dated Mar. 15, 2022, 8 pages.

(Continued)

*Primary Examiner* — Ayaz R Sheikh
*Assistant Examiner* — Tarell A Hampton
(74) *Attorney, Agent, or Firm* — COZEN O'CONNOR

(57) ABSTRACT

A contention random access method, includes: after sending a first message set concerning random access to a base station, waiting to receive a second message set concerning random access sent by the base station; determining whether overhead for waiting for the second message set reaches a first preset condition; if the overhead reaches the first preset condition, initiating random access to the base station in a preset manner; and if the overhead does not reach the first preset condition, continuing to wait for the second message set. According to the embodiments of the present disclosure, in cases where the overhead reaches the first preset condition, the random access manner can be changed, and the random access is initiated to the base station in a preset manner.

18 Claims, 7 Drawing Sheets

(56) References Cited

U.S. PATENT DOCUMENTS

2021/0168862 A1* 6/2021 Murray ............ H04W 74/0816
2021/0219349 A1* 7/2021 Huang ............ H04W 74/0833

OTHER PUBLICATIONS

European Patent Application No. 18938572.7, Search and Opinion dated Jun. 14, 2022, 10 pages.
ASUSTek "Consideration on fallback of 2-step RACH procedure" 3GPP TSG-RAN WG2 Meeting #NR Ad Hoc; R2-1700358; Jan. 2017; 4 pages.

* cited by examiner

COMPETITIVE RANDOM ACCESS METHOD AND DEVICE

CROSS-REFERENCE TO RELATED APPLICATION

This application is a U.S. national phase of International Application No. PCT/CN2018/113410, filed with the State Intellectual Property Office of P. R. China on Nov. 1, 2018.

TECHNICAL FIELD

The present disclosure relates to the technical field of communication, and more particularly, to a competitive random access method, a competitive random access device, an electronic apparatus and a non-volatile computer readable storage medium.

BACKGROUND

In the current competitive random access process, the user equipment sends a message to the base station twice. In some scenarios, the frequency band for random access may be occupied, thus the frequency band needs to be monitored and the random access process can be performed until the frequency band is idle, which indicates that every time the user equipment sends the message to the base station, it is necessary to monitor the frequency band. Since monitoring the frequency band takes time, this requirement may cause the whole random access process to take longer time.

In order to overcome the above-mentioned problems, the related technology integrates twice to send the message by the user equipment to the base station into one step. However, in this case, the amount of message data sent by the user equipment to the base station at one time is relatively large, which will cause an increase in signaling overhead and is not conducive to decoding by the base station, and may even lead to the base station not being able to feed back a message to the user equipment for the message sent by the user equipment and cause the user equipment to fail to complete the random access process.

SUMMARY

The present disclosure provides a method and an apparatus for adjusting antenna radiation power and an electronic device, to solve the problems in related technologies.

According to a first aspect of embodiments of the present disclosure, there is provided a competitive random access method, in which the competitive random access method is applicable to a terminal and includes:
  after sending a first message set of random access to a base station, waiting for receiving a second message set of the random access sent by the base station;
  determining whether an overhead of waiting for the second message set reaches a first preset condition;
  initiating the random access to the base station in a preset manner when the overhead of waiting for the second message set reaches the first preset condition;
  continuing waiting for the second message set when the overhead of waiting for the second message set does not reach the first preset condition;
  in which the preset manner includes: sending a first message of the random access to the base station; receiving a second message of the random access sent by the base station according to the first message; sending a third message of the random access to the base station according to the second message; and receiving a fourth message of the random access sent by the base station according to the third message.

According to a second aspect of embodiments of the present disclosure, there is provided a competitive random access method, in which the competitive random access method is applicable to a terminal and includes:
  determining whether a listen before talk (LBT) competition failure for an unlicensed frequency band reaches a second preset condition;
  initiating random access to a base station in a preset manner when the LBT competition failure reaches the second preset condition;
  sending a first message set of the random access to the base station when the LBT competition failure does not reach the second preset condition and an LBT competition succeeds, and waiting for receiving a second message set of the random access sent by the base station;
  in which the preset manner includes: sending a first message of the random access to the base station; receiving a second message of the random access sent by the base station according to the first message; sending a third message of the random access to the base station according to the second message; and receiving a fourth message of the random access sent by the base station according to the third message.

According to a third aspect of embodiments of the present disclosure, there is provided a competitive random access device, in which the competitive random access device is applicable to a terminal and includes:
  a reception waiting module configured to wait for receiving a second message set of random access sent by a base station after a first message set of the random access is sent to the base station;
  an overhead determining module configured to determine whether an overhead of waiting for the second message set reaches a first preset condition;
  a manner switching module configured to initiate the random access to the base station in a preset manner when the overhead of waiting for the second message set reaches the first preset condition;
  a continuous-waiting module configured to continue waiting for the second message set when the overhead of waiting for the second message set does not reach the first preset condition;
  in which the preset manner includes: sending a first message of the random access to the base station; receiving a second message of the random access sent by the base station according to the first message; sending a third message of the random access to the base station according to the second message; and receiving a fourth message of the random access sent by the base station according to the third message.

According to a fourth aspect of embodiments of the present disclosure, there is provided a competitive random access device, in which the competitive random access device is applicable to a terminal and comprises:
  a competition determining module configured to determine whether a listen before talk (LBT) competition failure for an unlicensed frequency band reaches a second preset condition;
  a manner switching module configured to initiate random access to a base station in a preset manner when the LBT competition failure reaches the second preset condition;

a random access module configured to send a first message set of the random access to the base station when the LBT competition failure does not reach the second preset condition and when a listen before talk (LBT) competition succeeds, and wait for receiving a second message set of the random access sent by the base station.

in which the preset manner includes: sending a first message of the random access to the base station; receiving a second message of the random access sent by the base station according to the first message; sending a third message of the random access to the base station according to the second message; and receiving a fourth message of the random access sent by the base station according to the third message.

According to a fifth aspect of embodiments of the present disclosure, there is provided an electronic apparatus, comprising a processor and a memory for storing instructions executable by the processor, in which the processor is configured to implement steps in any competitive random access method described above.

According to a sixth aspect of embodiments of the present disclosure, there is provided a computer readable storage medium storing therein computer instructions, wherein the computer instructions when executed by a processor implement steps in any competitive random access method described above.

BRIEF DESCRIPTION OF THE DRAWINGS

In order to more clearly describe the technical solutions in the embodiments of the present application, the following will briefly introduce the drawings that need to be used in the description of the embodiments. Obviously, the drawings in the following description are only some embodiments of the present application. For those of ordinary skill in the art, other drawings can be obtained without creative labor based on these drawings.

DETAILED DESCRIPTION

The following will clearly and completely describe the technical solutions in the embodiments of the present application in conjunction with the drawings in the embodiments of the present application. Obviously, the described embodiments are only a part of the embodiments of the present application, rather than all embodiments. Based on the embodiments in this application, all other embodiments obtained by those of ordinary skill in the art without creative work shall fall within the protection scope of this application.

Figure 1:
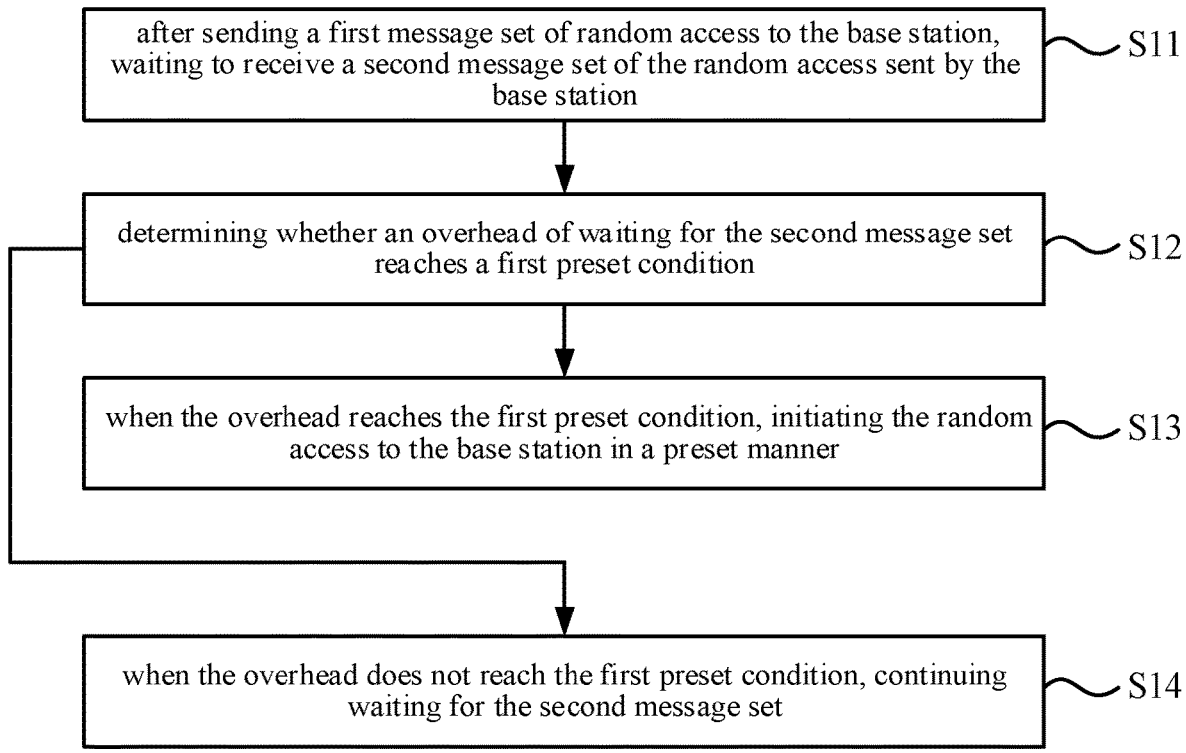
FIG. 1 is a schematic flowchart of a competitive random access method according to an embodiment of the present disclosure.

FIG. 1 is a schematic flowchart of a competitive random access method according to an embodiment of the present disclosure. The method shown in this embodiment can be applicable to a terminal that may be used as a user equipment to communicate with a base station. The terminal may communicate with the base station based on 4G LTE or communicate with the base station based on 5G NR. The terminal includes but is not limited to a mobile phone, a tablet computer, a wearable device and other electronic devices.

As shown in FIG. 1, the competitive random access method includes the following steps.

Step S11, after sending a first message set of random access to the base station, it is waited to receive a second message set of the random access sent by the base station.

Step S12, it is determined whether an overhead of waiting for the second message set reaches a first preset condition.

Step S13, when the overhead reaches the first preset condition, the random access is initiated to the base station in a preset manner.

Step S14, when the overhead does not reach the first preset condition, waiting for the second message set is continued.

The preset manner includes: sending a first message of the random access to the base station; receiving a second message of the random access sent by the base station according to the first message; sending a third message of the random access to the base station according to the second message; and receiving a fourth message of the random access sent by the base station according to the third message.

In an embodiment, the terminal may first send the first message set of the random access to the base station, and then wait for the second message set of the random access sent by the base station. In this case, if the second message set of the random access sent by the base station is received, the subsequent process of the random access can be continued, for example, it is determined that the random access is successful, thereby establishing a communication connection with the base station, or it is determined that the random access competition has failed.

That is, after sending the first message set of the random access to the base station, in order to continue the subsequent process of the random access, it is necessary to receive the second message set of the random access sent by the base station. However, the first message set may include multiple messages with a larger amount of data, it is difficult for the base station to decode, and in some cases, it cannot even be successful to decode, thus the second message set of the random access cannot be sent to the terminal, which causes the terminal to fail to complete the random access process. The completion of the random access process includes the success of the random access and the failure of the random access due to competition failure.

According to an embodiment of the present disclosure, it can be determined whether the overhead of waiting for the second message set reaches the first preset condition, in which the overhead of waiting for the second message set may be the duration of waiting for the second message set. When the terminal does not receive the second message set, it determines the number of random access failures plus one. The first message set may be sent to the base station again after it is determined that the random access fails, until the number of random access failures reaches the first preset number. In this case, the overhead of waiting for the second message set may be the number of random access failures during waiting for the second message set.

If the overhead reaches the first preset condition, it indicates that the overhead is too large for the manner that the random access is performed by sending the first message set to the base station and receiving the second message set sent by the base station. If the random access is still continued in this manner such as continuing waiting for the second message set sent by the base station or re-sending the first message set to the base station, there is a high probability that the second message set sent will not be received in a short time, making the terminal unable to successfully complete the random access process.

Therefore, when the overhead reaches the first preset condition, the manner of random access can be changed, and the random access can be initiated to the base station in the preset manner. In the preset manner, user equipment sends messages in twice, that is, sends the first message of the random access to the base station, and after receiving the second message sent by the base station, sends the third message of the random access message to the base station according to the second message. Therefore, in most cases, each of the first message and the third message sent in two steps has a smaller amount of data relative to the first message set, thus it is beneficial to improve the decoding success rate of the base station, so that the base station can feed back a message to the terminal according to the message sent by the terminal, thereby making the terminal smoothly complete the random access process.

If the overhead does not reach the first preset condition, continue waiting for the second message set, so as to complete the random access process while ensuring a lower delay.

Figure 2:
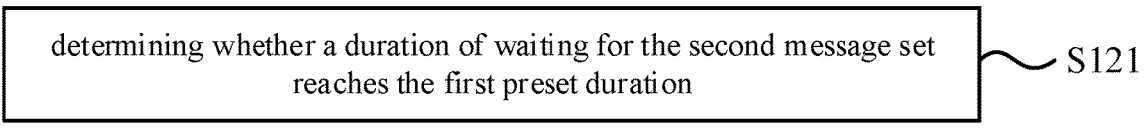
FIG. 2 is a schematic flowchart of determining whether the overhead of waiting for the second message set reaches the first preset condition according to an embodiment of the present disclosure.

FIG. 2 is a schematic flowchart of determining whether the overhead of waiting for the second message set reaches the first preset condition according to an embodiment of the present disclosure. As shown in FIG. 2, on the basis of the embodiment shown in FIG. 1, the first preset condition is a first preset duration, and the determining whether an overhead of waiting for the second message set reaches a first preset condition includes the following.

Step S121, it is determined whether the duration of waiting for the second message set reaches the first preset duration.

In an embodiment, the first preset condition is the first preset duration, and determining whether the overhead of waiting for the second message set reaches the first preset condition is to determine whether the duration of waiting for the second message set reaches the first preset duration. If the duration of waiting for the second message set reaches the first preset duration, it indicates that the terminal has waited a longer time to receive the second message set after sending the first message set, but the second message has not been received yet. If continue waiting for the second message set sent by the base station, there is a high probability that the second message set cannot be received in a short time, and the terminal cannot successfully complete the random access process.

Therefore, in this case, the random access manner can be changed, and the random access can be initiated to the base station in the preset manner, which is beneficial to improve the decoding success rate of the base station, so that the base station can feed back a message to the terminal according to the message sent by the terminal, thereby making the terminal smoothly complete the random access process.

Figure 3:
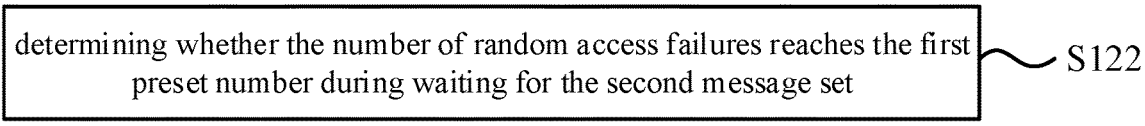
FIG. 3 is another schematic flowchart of determining whether the overhead of waiting for the second message set reaches the first preset condition according to an embodiment of the present disclosure.

FIG. 3 is another schematic flowchart of determining whether the overhead of waiting for the second message set reaches the first preset condition according to an embodiment of the present disclosure. As shown in FIG. 3, on the basis of the embodiment shown in FIG. 1, the first preset condition is a first preset number, and the determining whether an overhead of waiting for the second message set reaches a first preset condition includes the following.

Step S122, it is determined whether the number of random access failures reaches the first preset number during waiting for the second message set.

In an embodiment, the first preset condition is the first preset number, and determining whether the overhead of waiting for the second message set reaches the first preset condition is to determine whether the number of random access failures reaches the first preset number during waiting for the second message set. If the number of random access failures reaches the first preset number, it indicates that after sending the first message set by the terminal, due to fail to receive the second message set, the terminal further sends the first message set to the base station many times, but the second message has not been received yet. If resend the first message set and wait for the second message set, there is a high probability that the second message set cannot be received in a short time, and the terminal cannot successfully complete the random access process.

Therefore, in this case, the random access manner can be changed, and the random access can be initiated to the base station in the preset manner, which is beneficial to improve the decoding success rate of the base station, so that the base station can feed back a message to the terminal according to the message sent by the terminal, thereby making the terminal smoothly complete the random access process.

Figure 4:
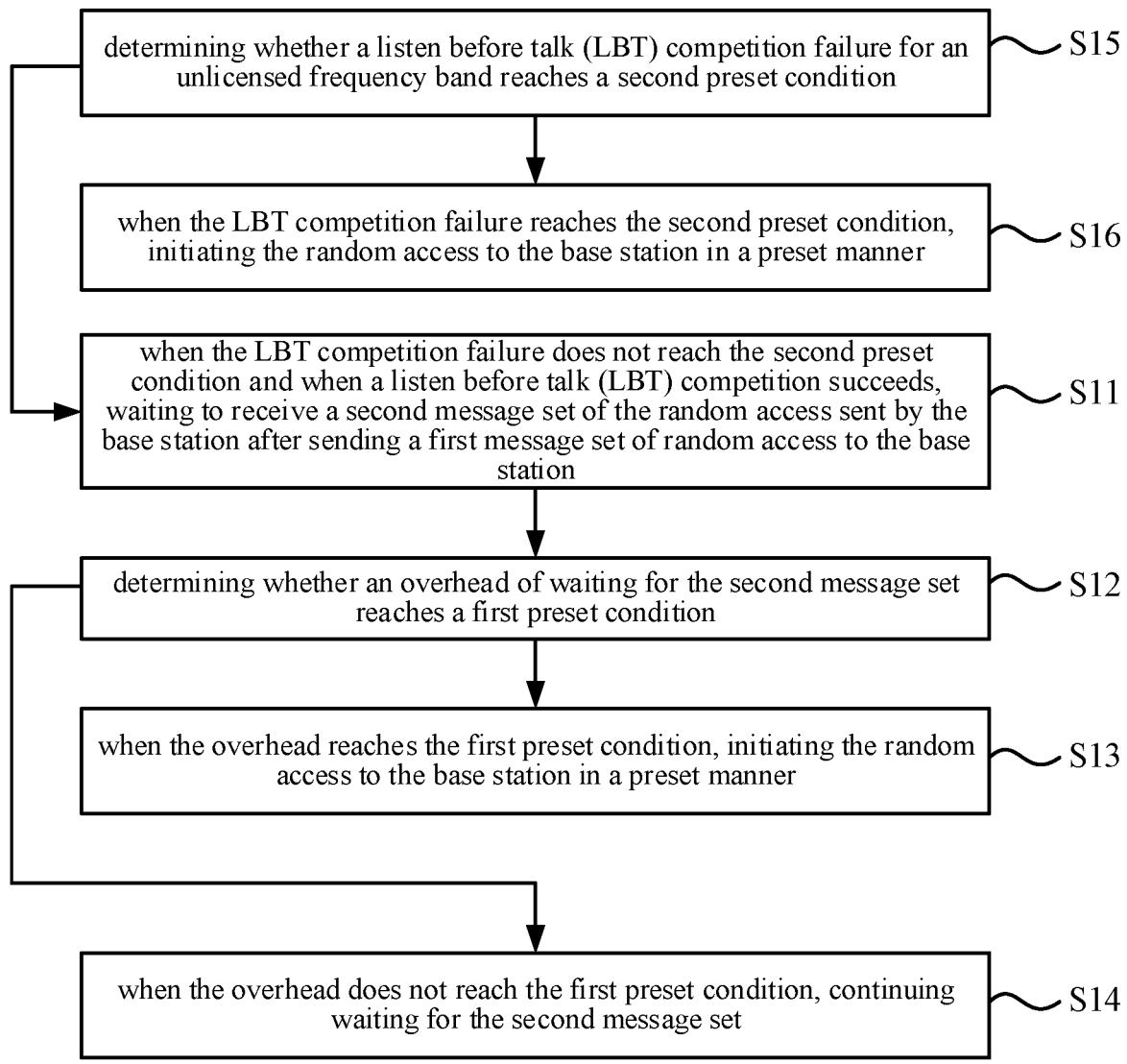
FIG. 4 is a schematic flowchart of another competitive random access method according to an embodiment of the present disclosure.

FIG. 4 is a schematic flowchart of another competitive random access method according to an embodiment of the present disclosure. As shown in FIG. 4, on the basis of the embodiment shown in FIG. 1, the method further includes the following.

Step S15, before sending the first message set of the random access to the base station, it is determined whether a listen before talk (LBT) competition failure for an unlicensed frequency band reaches a second preset condition.

Step S16, when the LBT competition failure reaches the second preset condition, the random access is initiated to the base station in a preset manner.

If the LBT competition failure does not reach the second preset condition and when a listen before talk (LBT) competition succeeds, performing step S11: sending the first message set of the random access to the base station, and waiting for receiving the second message set of the random access sent by the base station.

In an embodiment, the frequency band for the random access of the terminal may be the unlicensed frequency band. Since the unlicensed frequency band may be occupied by other devices, it is necessary to perform LBT (Listen Before Talk, collision avoidance mechanism) on the unlicensed frequency band before using the unlicensed frequency band, That is, the unlicensed frequency band is monitored to determine whether it is occupied, and if it is occupied, it is determined that the LBT competition has failed.

If the LBT competition failure reaches the second preset condition, for example, a non-idle duration of the unlicensed frequency band reaches the second preset duration, or after the unlicensed frequency band is determined to be not idle, the unlicensed frequency band is further monitored until the number of occurrences of monitoring that the unlicensed frequency band is not idle reaches the second preset number. In this case, it indicates that the unlicensed frequency band has been occupied by other devices for a long time or frequently. If in this case, the random access is performed still in the manner of sending the first message set to the base station and waiting for the second message set sent by the base station, due to the larger amount of data in the first message set, the first message set needs to occupy more time domain resources, and it is easy to collide with the behavior of other devices occupying the unlicensed frequency band, for example, the duration of the unlicensed frequency band not occupied by other device is relatively short, which is not enough to send the first message set through the unlicensed frequency band, causing the terminal unable to smoothly complete the random access process.

According to an embodiment of the present disclosure, in the case that the LBT competition failure reaches the second preset condition, the random access manner can be changed, and the random access can be initiated to the base station in the preset manner. In the preset manner, user equipment sends messages in twice, that is, sends the first message of the random access to the base station and sends the third message of the random access message to the base station according to the second message. Therefore, in most cases, each of the first message and the third message sent in two steps has a smaller amount of data relative to the first message set, thus in the case that the duration of the unlicensed frequency band not occupied by other device is relatively short, it is also enough to respectively send the first message and the third message via the unlicensed frequency band, thereby making the terminal smoothly complete the random access process.

In the case that the LBT competition failure does not reach the second preset condition, the random access may be performed in the manner of sending the first message set of the random access to the base station and waiting for the second message set sent by the base station, so as to complete the random access process while ensuring a lower delay.

Figure 5:
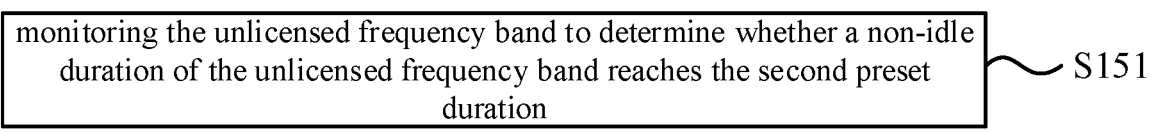
FIG. 5 is a schematic flow chart of determining whether the LBT competition failure for an unlicensed frequency band reaches the second preset condition according to an embodiment of the present disclosure.

FIG. 5 is a schematic flow chart of determining whether the LBT competition failure for an unlicensed frequency band reaches the second preset condition according to an embodiment of the present disclosure. As shown in FIG. 5, on the basis of the embodiment shown in FIG. 4, the second preset condition is a second preset duration, and the determining whether a listen before talk (LBT) competition failure for an unlicensed frequency band reaches a second preset condition includes the following.

Step S151, the unlicensed frequency band is monitored to determine whether a non-idle duration of the unlicensed frequency band reaches the second preset duration.

In an embodiment, the second preset condition is the second preset duration, and the determining whether the LBT competition failure for an unlicensed frequency band reaches the second preset condition is to determine whether the non-idle duration of the unlicensed frequency band reaches the second preset duration. If the non-idle duration of the unlicensed frequency band reaches the second preset duration, it indicates that the unlicensed frequency band has been occupied by other devices for a long time. If the random access is performed in the manner of sending the first message set to the base station and waiting for the second message set sent by the base station, it is probably to collide with the behavior of other devices occupying the unlicensed frequency band, causing the terminal unable to smoothly complete the random access process.

Therefore, in this case, the random access manner can be changed, and the random access can be initiated to the base station in the preset manner, which reduces the probability of collision between the random access process and the behavior of other devices occupying the unlicensed frequency band, thereby ensuring the terminal smoothly complete the random access process.

Figure 6:
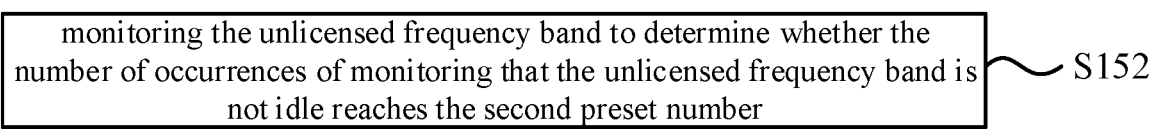
FIG. 6 is another schematic flow chart of determining whether the LBT competition failure for an unlicensed frequency band reaches the second preset condition according to an embodiment of the present disclosure.

FIG. 6 is another schematic flow chart of determining whether the LBT competition failure for an unlicensed frequency band reaches the second preset condition according to an embodiment of the present disclosure. As shown in FIG. 6, on the basis of the embodiment shown in FIG. 4, the second preset condition is a second preset number, and the determining whether a listen before talk (LBT) competition failure for an unlicensed frequency band reaches a second preset condition includes the following.

Step S152, the unlicensed frequency band is continued to determine whether the number of occurrences of monitoring that the unlicensed frequency band is not idle reaches the second preset number.

In an embodiment, the second preset condition is the second preset number, and the determining whether the LBT competition failure in the unlicensed frequency band reaches the second preset condition is to determine whether the number of occurrences of monitoring that the unlicensed frequency band is not idle reaches the second preset number. If the number of occurrences of monitoring that the unlicensed frequency band is not idle reaches the second preset number, it indicates that the unlicensed frequency band has been occupied by other devices frequently. If the random access is performed in the manner of sending the first message set to the base station and waiting for the second message set sent by the base station, it is probably to collide with the behavior of other devices occupying the unlicensed frequency band, causing the terminal unable to smoothly complete the random access process.

Therefore, in this case, the random access manner can be changed, and the random access can be initiated to the base station in the preset manner, which reduces the probability of collision between the random access process and the behavior of other devices occupying the unlicensed frequency band, thereby ensuring the terminal smoothly complete the random access process.

Alternatively, the second preset condition may be determined according to a configuration message sent by the base station or determined according to pre-stored information.

Alternatively, the first preset condition may be determined according to a configuration message sent by the base station or determined according to pre-stored information.

In an embodiment, the first preset condition and the second preset condition may be configured with the configuration message sent by the base station. In this case, the flexibility of configuring the first preset condition and the second preset condition can be improved.

In an embodiment, the first preset condition and the second preset condition may also be pre-stored by the terminal, for example, stored in the terminal by the user of the terminal. In this case, the terminal does not need to receive the configuration message for the first preset condition and the second preset condition from the base station, which is beneficial to reduce the overhead of terminal.

Alternatively, the first message set includes the first message of random access and/or the third message of random access.

Alternatively, the first message set includes the first message of random access, and/or the third message of random access, and/or other messages.

In an embodiment, the first message set may include the first message of random access, may also include the third message of random access, and may further include other messages such as a request for cell handover and a request for resource configuration.

Alternatively, the second message set includes the second message of random access and/or the fourth message of random access.

Alternatively, the second message set includes the second message of random access, and/or the fourth message of random access, and/or other messages.

In an embodiment, the second message set may include the second message of random access, may also include the fourth message of random access, and may further include other messages such as an instruction for cell handover and an instruction for resource configuration.

Figures 7, 8, 9:
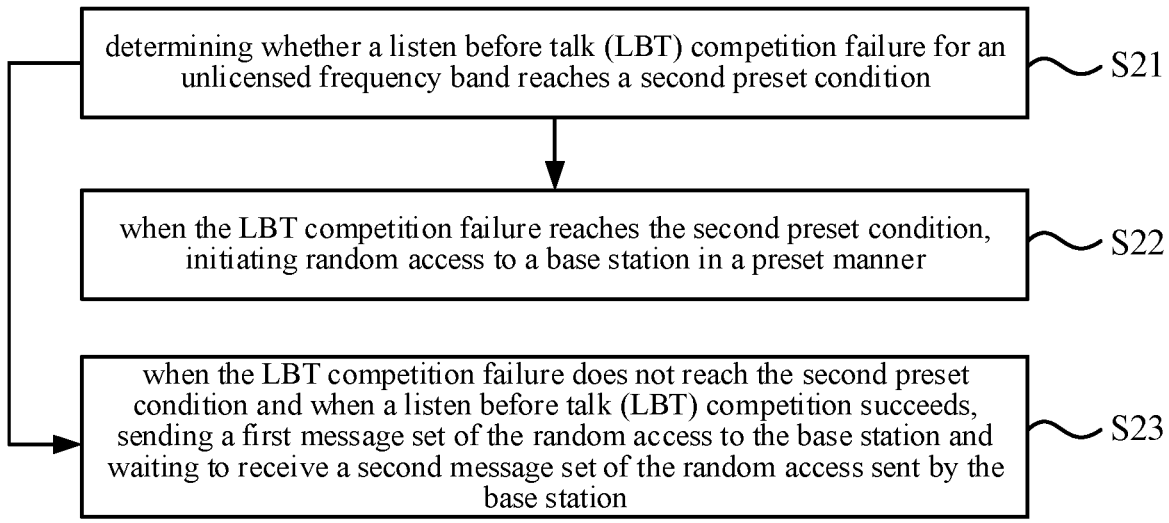
FIG. 7 is a schematic flowchart of another competitive random access method according to an embodiment of the present disclosure.
FIG. 8 is a schematic flow chart of determining whether the LBT competition failure for an unlicensed frequency band reaches the second preset condition according to an embodiment of the present disclosure.
FIG. 9 is another schematic flow chart of determining whether the LBT competition failure for an unlicensed frequency band reaches the second preset condition according to an embodiment of the present disclosure.

FIG. 7 is a schematic flowchart of another competitive random access method according to an embodiment of the present disclosure. The method shown in this embodiment can be applicable to a terminal that may be used as a user equipment to communicate with a base station. The terminal may communicate with the base station based on 4G LTE or communicate with the base station based on 5G NR. The terminal includes but is not limited to a mobile phone, a tablet computer, a wearable device and other electronic devices.

As shown in FIG. 7, the competitive random access method includes the following steps.

Step S21, it is determined whether a listen before talk (LBT) competition failure for an unlicensed frequency band reaches a second preset condition.

Step S22, when the LBT competition failure reaches the second preset condition, random access is initiated to a base station in a preset manner.

Step S23, when the LBT competition failure does not reach the second preset condition and when a listen before talk (LBT) competition succeeds, a first message set of the random access is sent to the base station and it is waited to receive a second message set of the random access sent by the base station.

The preset manner includes: sending a first message of the random access to the base station; receiving a second message of the random access sent by the base station according to the first message; sending a third message of the random access to the base station according to the second message; and receiving a fourth message of the random access sent by the base station according to the third message.

In an embodiment, the frequency band for the random access of the terminal may be the unlicensed frequency band. Since the unlicensed frequency band may be occupied by other devices, it is necessary to perform LBT (Listen Before Talk, collision avoidance mechanism) on the unlicensed frequency band before using the unlicensed frequency band, That is, the unlicensed frequency band is monitored to determine whether it is occupied, and if it is occupied, it is determined that the LBT competition has failed.

If the LBT competition failure reaches the second preset condition, for example, a non-idle duration of the unlicensed frequency band reaches the second preset duration, or after the unlicensed frequency band is determined to be not idle, the unlicensed frequency band is further monitored until the number of occurrences of monitoring that the unlicensed frequency band is not idle reaches the second preset number. In this case, it indicates that the unlicensed frequency band has been occupied by other devices for a long time or frequently. If in this case, the random access is performed still in the manner of sending the first message set to the base station and waiting for the second message set sent by the base station, due to the larger amount of data in the first message set, the first message set needs to occupy more time domain resources, and it is easy to collide with the behavior of other devices occupying the unlicensed frequency band, for example, the duration of the unlicensed frequency band not occupied by other device is relatively short, which is not enough to send the first message set through the unlicensed frequency band, causing the terminal unable to smoothly complete the random access process.

According to an embodiment of the present disclosure, in the case that the LBT competition failure reaches the second preset condition, the random access manner can be changed, and the random access can be initiated to the base station in the preset manner. In the preset manner, user equipment sends messages in twice, that is, sends the first message of the random access to the base station and sends the third message of the random access message to the base station according to the second message. Therefore, in most cases, each of the first message and the third message sent in two steps has a smaller amount of data relative to the first message set, thus in the case that the duration of the unlicensed frequency band not occupied by other device is relatively short, it is also enough to respectively send the first message and the third message via the unlicensed frequency band, thereby making the terminal smoothly complete the random access process.

In the case that the LBT competition failure does not reach the second preset condition, the random access may be performed in the manner of sending the first message set of the random access to the base station and waiting for the second message set sent by the base station, so as to complete the random access process while ensuring a lower delay.

FIG. 8 is a schematic flow chart of determining whether the LBT competition failure for an unlicensed frequency band reaches the second preset condition according to an embodiment of the present disclosure. As shown in FIG. 8, on the basis of the embodiment shown in FIG. 7, the second preset condition is a second preset duration, and the determining whether a listen before talk (LBT) competition failure for an unlicensed frequency band reaches a second preset condition includes the following.

Step S211, the unlicensed frequency band is monitored to determine whether a non-idle duration of the unlicensed frequency band reaches the second preset duration.

In an embodiment, the second preset condition is the second preset duration, and the determining whether the LBT competition failure for an unlicensed frequency band reaches the second preset condition is to determine whether the non-idle duration of the unlicensed frequency band reaches the second preset duration. If the non-idle duration of the unlicensed frequency band reaches the second preset duration, it indicates that the unlicensed frequency band has been occupied by other devices for a long time. If the random access is performed in the manner of sending the first message set to the base station and waiting for the second message set sent by the base station, it is probably to collide with the behavior of other devices occupying the unlicensed frequency band, causing the terminal unable to smoothly complete the random access process.

Therefore, in this case, the random access manner can be changed, and the random access can be initiated to the base station in the preset manner, which reduces the probability of collision between the random access process and the behavior of other devices occupying the unlicensed frequency band, thereby ensuring the terminal smoothly complete the random access process.

FIG. 9 is another schematic flow chart of determining whether the LBT competition failure for an unlicensed frequency band reaches the second preset condition according to an embodiment of the present disclosure. As shown in FIG. 9, on the basis of the embodiment shown in FIG. 7, the second preset condition is a second preset number, and the determining whether a listen before talk (LBT) competition failure for an unlicensed frequency band reaches a second preset condition includes the following.

Step S212, the unlicensed frequency band is monitored to determine whether the number of occurrences of monitoring that the unlicensed frequency band is not idle reaches the second preset number.

In an embodiment, the second preset condition is the second preset number, and the determining whether the LBT competition failure in the unlicensed frequency band reaches the second preset condition is to determine whether the number of occurrences of monitoring that the unlicensed frequency band is not idle reaches the second preset number. If the number of occurrences of monitoring that the unlicensed frequency band is not idle reaches the second preset number, it indicates that the unlicensed frequency band has been occupied by other devices frequently. If the random access is performed in the manner of sending the first message set to the base station and waiting for the second message set sent by the base station, it is probably to collide with the behavior of other devices occupying the unlicensed frequency band, causing the terminal unable to smoothly complete the random access process.

Therefore, in this case, the random access manner can be changed, and the random access can be initiated to the base station in the preset manner, which reduces the probability of collision between the random access process and the behavior of other devices occupying the unlicensed frequency band, thereby ensuring the terminal smoothly complete the random access process.

Figures 10, 11, 12:
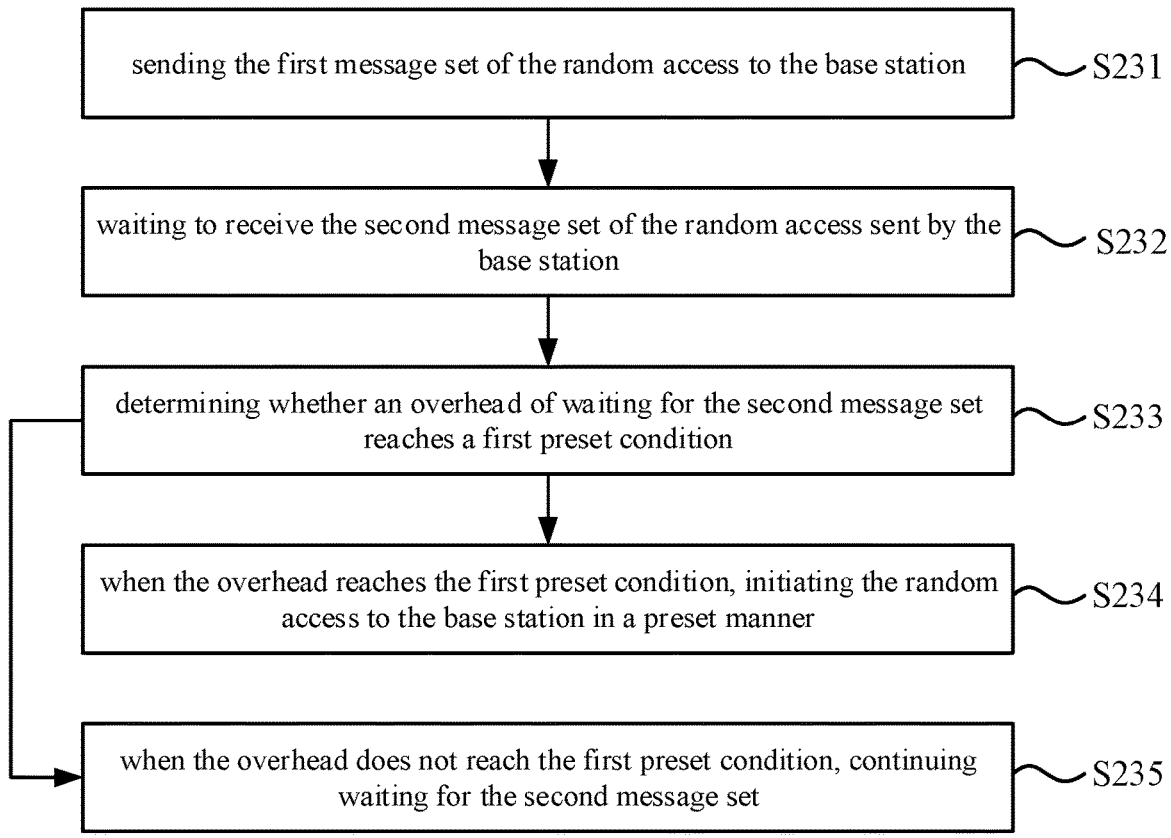
FIG. 10 is a schematic flowchart of sending the first message set of the random access to the base station and waiting for receiving the second message set of the random access sent by the base station according to an embodiment of the present disclosure.
FIG. 11 is a schematic flowchart of determining whether the overhead of waiting for the second message set reaches the first preset condition according to an embodiment of the present disclosure.
FIG. 12 is another schematic flowchart of determining whether the overhead of waiting for the second message set reaches the first preset condition according to an embodiment of the present disclosure.

FIG. 10 is a schematic flowchart of sending the first message set of the random access to the base station and waiting for receiving the second message set of the random access sent by the base station according to an embodiment of the present disclosure. As shown in FIG. 10, based on the embodiment shown in FIG. 7, the sending a first message set of the random access to the base station, and waiting for receiving a second message set of the random access sent by the base station includes the following.

Step S231, the first message set of the random access is sent to the base station.

Step S232, it is waited to receive the second message set of the random access sent by the base station.

Step S233, it is determined whether an overhead of waiting for the second message set reaches a first preset condition.

Step S234, when the overhead reaches the first preset condition, the random access is initiated to the base station in a preset manner.

Step S235, when the overhead does not reach the first preset condition, waiting for the second message set is continued.

The preset manner includes: sending a first message of the random access to the base station; receiving a second message of the random access sent by the base station according to the first message; sending a third message of the random access to the base station according to the second message; and receiving a fourth message of the random access sent by the base station according to the third message.

In an embodiment, the terminal may first send the first message set of the random access to the base station, and then wait for the second message set of the random access sent by the base station. In this case, if the second message set of the random access sent by the base station is received, the subsequent process of the random access can be continued, for example, it is determined that the random access is successful, thereby establishing a communication connection with the base station, or it is determined that the random access competition has failed.

That is, after sending the first message set of the random access to the base station, in order to continue the subsequent process of the random access, it is necessary to receive the second message set of the random access sent by the base station. However, the first message set may include multiple messages with a larger amount of data, it is difficult for the base station to decode, and in some cases, it cannot even be successful to decode, thus the second message set of the random access cannot be sent to the terminal, which causes the terminal to fail to complete the random access process. The completion of the random access process includes the success of the random access and the failure of the random access due to competition failure.

According to an embodiment of the present disclosure, it can be determined whether the overhead of waiting for the second message set reaches the first preset condition, in which the overhead of waiting for the second message set may be the duration of waiting for the second message set. When the terminal does not receive the second message set, it determines the number of random access failures plus one. The first message set may be sent to the base station again after it is determined that the random access fails, until the number of random access failures reaches the first preset number. In this case, the overhead of waiting for the second message set may be the number of random access failures during waiting for the second message set.

If the overhead reaches the first preset condition, it indicates that the overhead is too large for the manner that the random access is performed by sending the first message set to the base station and receiving the second message set sent by the base station. If the random access is still continued in this manner such as continuing waiting for the second message set sent by the base station or re-sending the first message set to the base station, there is a high probability that the second message set sent will not be received in a short time, making the terminal unable to successfully complete the random access process.

Therefore, when the overhead reaches the first preset condition, the manner of random access can be changed, and the random access can be initiated to the base station in the preset manner. In the preset manner, user equipment sends messages in twice, that is, sends the first message of the random access to the base station, and sends the third message of the random access message to the base station according to the second message. Therefore, in most cases, each of the first message and the third message sent in two steps has a smaller amount of data relative to the first message set, thus it is beneficial to improve the decoding success rate of the base station, so that the base station can feed back a message to the terminal according to the message sent by the terminal, thereby making the terminal smoothly complete the random access process.

If the overhead does not reach the first preset condition, continue waiting for the second message set, so as to complete the random access process while ensuring a lower delay.

FIG. 11 is a schematic flowchart of determining whether the overhead of waiting for the second message set reaches the first preset condition according to an embodiment of the present disclosure. As shown in FIG. 11, on the basis of the embodiment shown in FIG. 10, the first preset condition is a first preset duration, and the determining whether an overhead of waiting for the second message set reaches a first preset condition includes the following.

Step S2331, it is determined whether a duration of waiting for the second message set reaches the first preset duration.

In an embodiment, the first preset condition is the first preset duration, and determining whether the overhead of waiting for the second message set reaches the first preset condition is to determine whether the duration of waiting for the second message set reaches the first preset duration. If the duration of waiting for the second message set reaches the first preset duration, it indicates that the terminal has waited a longer time to receive the second message set after sending the first message set, but the second message has not been received yet. If continue waiting for the second message set sent by the base station, there is a high probability that the second message set cannot be received in a short time, and the terminal cannot successfully complete the random access process.

Therefore, in this case, the random access manner can be changed, and the random access can be initiated to the base station in the preset manner, which is beneficial to improve the decoding success rate of the base station, so that the base station can feed back a message to the terminal according to the message sent by the terminal, thereby making the terminal smoothly complete the random access process.

FIG. 12 is another schematic flowchart of determining whether the overhead of waiting for the second message set reaches the first preset condition according to an embodiment of the present disclosure. As shown in FIG. 12, on the basis of the embodiment shown in FIG. 10, the first preset condition is a first preset number, and the determining whether an overhead of waiting for the second message set reaches a first preset condition includes the following.

Step S2332, it is determined whether the number of random access failures reaches the first preset number during waiting for the second message set.

In an embodiment, the first preset condition is the first preset number, and determining whether the overhead of waiting for the second message set reaches the first preset condition is to determine whether the number of random access failures reaches the first preset number during waiting for the second message set. If the number of random access failures reaches the first preset number, it indicates that after sending the first message set by the terminal, due to fail to receive the second message set, the terminal further sends the first message set to the base station many times, but the second message has not been received yet. If resend the first message set and wait for the second message set, there is a high probability that the second message set cannot be received in a short time, and the terminal cannot successfully complete the random access process.

Therefore, in this case, the random access manner can be changed, and the random access can be initiated to the base station in the preset manner, which is beneficial to improve the decoding success rate of the base station, so that the base station can feed back a message to the terminal according to the message sent by the terminal, thereby making the terminal smoothly complete the random access process.

Alternatively, the first preset condition may be determined according to a configuration message sent by the base station or determined according to pre-stored information.

Alternatively, the second preset condition may be determined according to a configuration message sent by the base station or determined according to pre-stored information.

In an embodiment, the first preset condition and the second preset condition may be configured with the configuration message sent by the base station. In this case, the flexibility of configuring the first preset condition and the second preset condition can be improved.

In an embodiment, the first preset condition and the second preset condition may also be pre-stored by the terminal, for example, stored in the terminal by the user of the terminal. In this case, the terminal does not need to receive the configuration message for the first preset condition and the second preset condition from the base station, which is beneficial to reduce the overhead of terminal.

Alternatively, the first message set includes the first message of random access and/or the third message of random access.

Alternatively, the first message set includes the first message of random access, and/or the third message of random access, and/or other messages.

In an embodiment, the first message set may include the first message of random access, may also include the third message of random access, and may further include other messages such as a request for cell handover and a request for resource configuration.

Alternatively, the second message set includes the second message of random access and/or the fourth message of random access.

Alternatively, the second message set includes the second message of random access, and/or the fourth message of random access, and/or other messages.

In an embodiment, the second message set may include the second message of random access, may also include the fourth message of random access, and may further include other messages such as an instruction for cell handover and an instruction for resource configuration.

Corresponding to the aforementioned embodiments of the competitive random access method, the present disclosure also provides embodiments of the competitive random access device.

Figure 13:
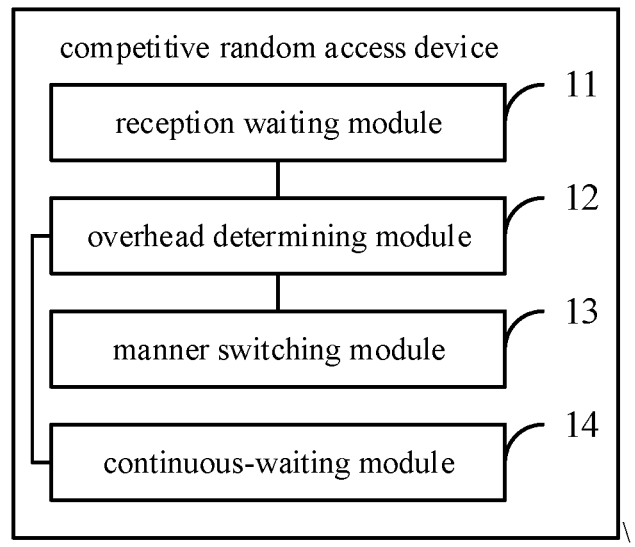
FIG. 13 is a block diagram of a competitive random access device according to an embodiment of the present disclosure.

FIG. 13 is a block diagram of a competitive random access device according to an embodiment of the present disclosure. The device shown in this embodiment can be applicable to a terminal that may be used as a user equipment to communicate with a base station. The terminal may communicate with the base station based on 4G LTE or communicate with the base station based on 5G NR. The terminal includes but is not limited to a mobile phone, a tablet computer, a wearable device and other electronic devices.

As shown in FIG. 13, the competitive random access device includes: a reception waiting module 11, an overhead determining module 12, a manner switching module 13 and a continuous-waiting module 14.

The reception waiting module 11 is configured for waiting for receiving a second message set of random access sent by a base station after sending a first message set of random access to the base station.

The overhead determining module 12 is configured for determining whether an overhead of waiting for the second message set reaches a first preset condition.

The manner switching module 13 is configured for initiating the random access to the base station in a preset manner if the overhead reaches the first preset condition.

The continuous-waiting module 14 is configured for continuing waiting for the second message set if the overhead does not reach the first preset condition.

The preset manner includes: sending a first message of the random access to the base station; receiving a second message of the random access sent by the base station according to the first message; sending a third message of the random access to the base station according to the second message; and receiving a fourth message of the random access sent by the base station according to the third message.

Alternatively, the first preset condition is a first preset duration, and the overhead determining module is configured for determining whether the duration of waiting for the second message set reaches the first preset duration.

Alternatively, the first preset condition is a first preset number, and the overhead determining module is configured for determining whether a number of random access failures reaches the first preset number during waiting for the second message set.

Figure 14:
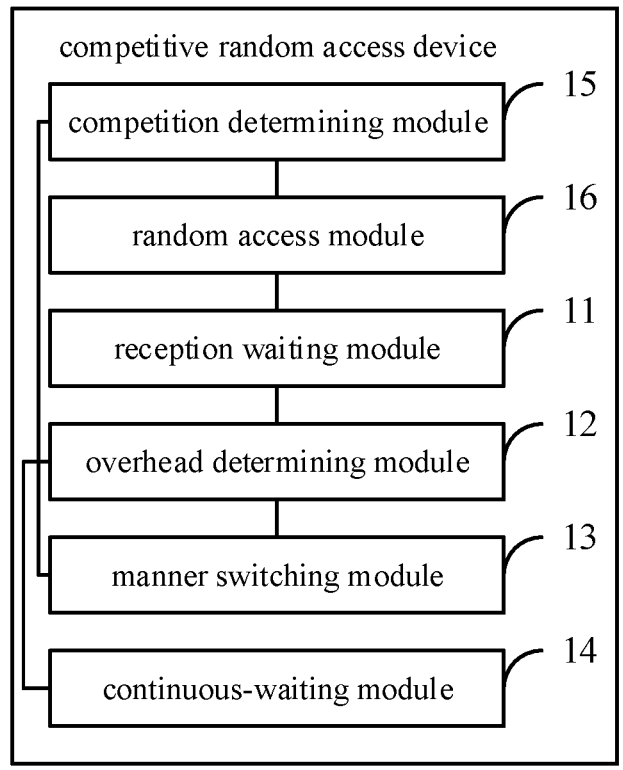
FIG. 14 is a block diagram of another competitive random access device according to an embodiment of the present disclosure.

FIG. 14 is a block diagram of another competitive random access device according to an embodiment of the present disclosure. As shown in FIG. 14, on the basis of the embodiment shown in FIG. 13, the device further comprises: a competition determining module 15 and a random access module 16.

The competition determining module 15 is configured for determining whether a listen before talk (LBT) competition failure for an unlicensed frequency band reaches a second preset condition before sending the first message set of the random access to the base station.

The manner switching module 13 is configured for initiating the random access to the base station in a preset manner if the LBT competition failure reaches the second preset condition.

The random access module 16 is configured for sending the first message set of the random access to the base station if the LBT competition failure does not reach the second preset condition.

Alternatively, the second preset condition is a second preset duration, and the competition determining module is configured for monitoring the unlicensed frequency band to determine whether a non-idle duration of the unlicensed frequency band reaches the second preset duration.

Alternatively, the second preset condition is a second preset number, and the competition determining module is configured for monitoring the unlicensed frequency band to determine whether a number of occurrences of monitoring that the unlicensed frequency band is not idle reaches the second preset number.

Alternatively, the second preset condition is determined according to a configuration message sent by the base station or determined according to pre-stored information.

Alternatively, the first preset condition is determined according to a configuration message sent by the base station or determined according to pre-stored information.

Alternatively, the first message set includes the first message of random access and/or the third message of random access.

Alternatively, the first message set includes the first message of random access, and/or the third message of random access, and/or other messages.

Alternatively, the second message set includes the second message of random access and/or the fourth message of random access.

Alternatively, the second message set includes the second message of random access and/or the fourth message of random access, and/or other messages.

Figure 15:
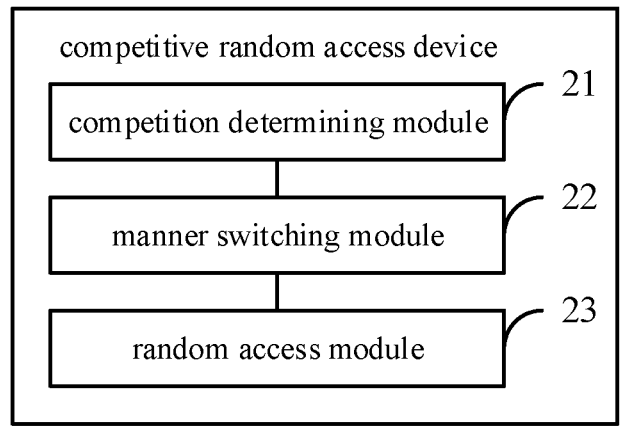
FIG. 15 is a block diagram of further competitive random access device according to an embodiment of the present disclosure.

FIG. 15 is a block diagram of further competitive random access device according to an embodiment of the present disclosure. The device shown in this embodiment can be applicable to a terminal that may be used as a user equipment to communicate with a base station. The terminal may communicate with the base station based on 4G LTE or communicate with the base station based on 5G NR. The terminal includes but is not limited to a mobile phone, a tablet computer, a wearable device and other electronic devices.

As shown in FIG. 15, the competitive random access device includes: a competition determining module 21, a manner switching module 22, and a random access module 23.

The competition determining module 21 is configured for determining whether a listen before talk (LBT) competition failure for an unlicensed frequency band reaches a second preset condition.

The manner switching module 22 is configured for initiating random access to a base station in a preset manner if the LBT competition failure reaches the second preset condition.

The random access module 23 is configured for sending a first message set of the random access to the base station when the LBT competition failure does not reach the second preset condition and when a listen before talk (LBT) competition succeeds, and waiting for receiving a second message set of the random access sent by the base station.

The preset manner includes: sending a first message of the random access to the base station; receiving a second message of the random access sent by the base station according to the first message; sending a third message of the random access to the base station according to the second message; and receiving a fourth message of the random access sent by the base station according to the third message.

Alternatively, the second preset condition is a second preset duration, and the competition determining module is configured for monitoring the unlicensed frequency band to determine whether a non-idle duration of the unlicensed frequency band reaches the second preset duration.

Alternatively, the second preset condition is a second preset number, and the competition determining module is configured for monitoring the unlicensed frequency band to determine whether a number of occurrences of monitoring that the unlicensed frequency band is not idle reaches the second preset number.

Figure 16:
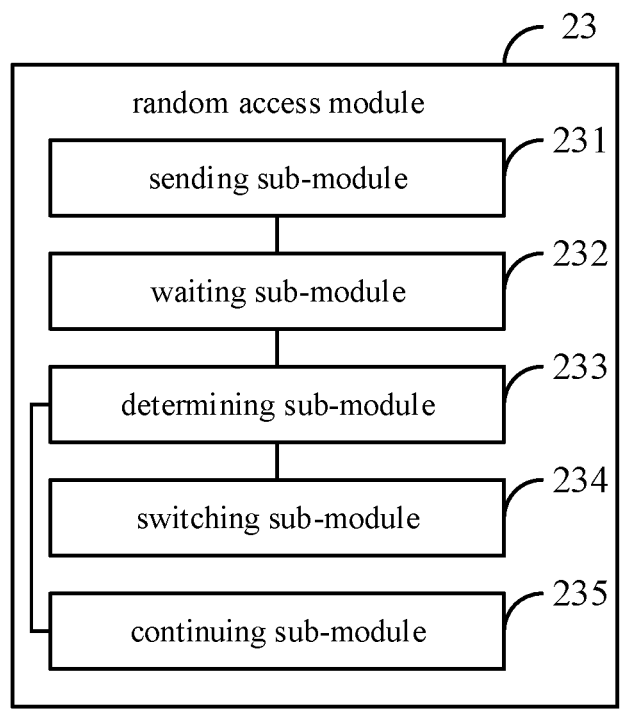
FIG. 16 is a block diagram of the random access module according to an embodiment of the present disclosure.

FIG. 16 is a block diagram of the random access module according to an embodiment of the present disclosure. As shown in FIG. 16, on the basis of the embodiment shown in FIG. 15, the random access module 23 comprises: a sending sub-module 231, a waiting sub-module 232, a determining sub-module 233, a switching sub-module 234 and a continuing sub-module 235.

The sending sub-module 231 is configured for sending the first message set of the random access to the base station.

The waiting sub-module 232 is configured for waiting for receiving the second message set of the random access sent by the base station.

The determining sub-module 233 is configured for determining whether an overhead of waiting for the second message set reaches a first preset condition.

The switching sub-module 234 is configured for initiating the random access to the base station in a preset manner if the overhead reaches the first preset condition.

The continuing sub-module 235 is configured for continuing waiting for the second message set if the overhead does not reach the first preset condition.

The preset manner includes: sending a first message of the random access to the base station; receiving a second message of the random access sent by the base station according to the first message; sending a third message of the random access to the base station according to the second message; and receiving a fourth message of the random access sent by the base station according to the third message.

Alternatively, the first preset condition is a first preset duration, and the determining sub-module is configured for determining whether the duration of waiting for the second message set reaches the first preset duration.

Alternatively, the first preset condition is a first preset number, and the determining sub-module is configured for determining whether a number of random access failures reaches the first preset number during waiting for the second message set.

Alternatively, the first preset condition is determined according to a configuration message sent by the base station or determined according to pre-stored information.

Alternatively, the second preset condition is determined according to a configuration message sent by the base station or determined according to pre-stored information.

Alternatively, the first message set includes the first message of random access and/or the third message of random access.

Alternatively, the first message set includes the first message of random access, and/or the third message of random access, and/or other messages.

Alternatively, the second message set includes the second message of random access and/or the fourth message of random access.

Alternatively, the second message set includes the second message of random access and/or the fourth message of random access, and/or other messages.

Regarding the device in the foregoing embodiment, the specific manner in which each module performs operations has been described in detail in the embodiments of the related method, and will not be elaborated here.

For the device embodiment, since it basically corresponds to the method embodiment, please refer to the part of the description of the method embodiment for related parts. The device embodiments described above are merely illustrative, where the units described as separate components may or may not be physically separated, and the components shown as units may or may not be physical units, that is, they may be located in one place, or it can be distributed to multiple network units. Some or all of the modules can be selected according to actual needs to achieve the objectives of the solutions of the embodiments. Those of ordinary skill in the art can understand and implement without creative work.

An embodiment of the present disclosure also provides an electronic apparatus, comprising a processor and a memory for storing instructions executable by the processor, wherein the processor is configured to upon execution implement steps in any competitive random access method described above.

An embodiment of the present disclosure also provides a computer readable storage medium storing therein computer instructions, wherein the computer instructions when executed by a processor implement steps in any competitive random access method described above.

Figure 17:
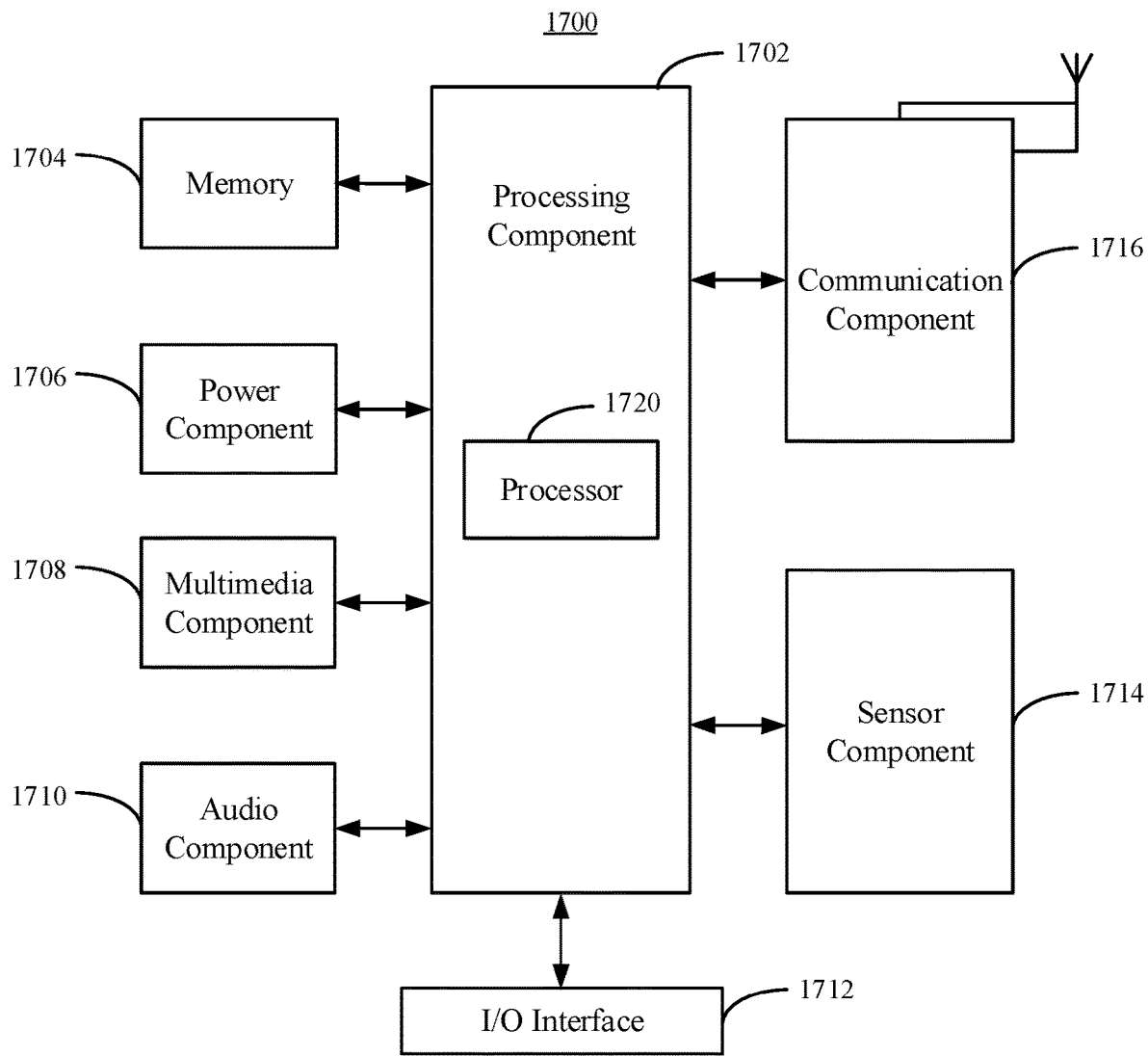
FIG. 17 is a block diagram of a competitive random access device according to an embodiment of the present disclosure.

FIG. 17 is a block diagram of a competitive random access device 1700 according to an embodiment of the present disclosure. For example, the device 1700 may be a mobile phone, a computer, a digital broadcast terminal, a messaging device, a gaming console, a tablet, a medical device, exercise equipment, a personal digital assistant, and the like.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 can access a wireless network based on a communication standard, such as WiFi, 2G; or 3G; or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1720 in the device 1700, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

It should be noted that in this article, relational terms such as first and second are only used to distinguish one entity or operation from another entity or operation, and do not necessarily require or imply there is any such actual relationship or sequence between these entities or operations. The terms "include", "contain", or any other variants thereof are intended to cover non-exclusive inclusion, so that a process, method, article or device that includes a series of elements includes not only those elements, but also other elements that are not explicitly listed elements, or also include elements inherent to such processes, methods, articles, or equipment. If there are no more restrictions, the element defined by the sentence "including a . . . " does not exclude the existence of other identical elements in the process, method, article, or equipment that includes the element.

The methods and devices provided by the embodiments of the present invention are described in detail above. Specific examples are used in this article to illustrate the principles and implementations of the present invention. The descriptions of the above embodiments are only used to help understand the method and its core idea of the present invention. At the same time, for those of ordinary skill in the art, according to the idea of the present invention, there will be changes in the specific implementation and the scope of application. In summary, the content of this specification should not be construed as a limitation of the invention.

What is claimed is:

1. A competitive random access method applicable to a terminal, comprising:
   after sending a first message set of random access to a base station, waiting for receiving a second message set of the random access sent by the base station;
   determining whether an overhead of waiting for the second message set reaches a first preset condition;
   initiating the random access to the base station in a preset manner when the overhead of waiting for the second message set reaches the first preset condition;
   continuing waiting for the second message set when the overhead of waiting for the second message set does not reach the first preset condition;
   wherein the preset manner comprises: sending a first message of the random access to the base station; receiving a second message of the random access sent by the base station according to the first message; sending a third message of the random access to the base station according to the second message; and receiving a fourth message of the random access sent by the base station according to the third message;
   the method further comprising:
   before sending the first message set of the random access to the base station, determining whether a listen before talk (LBT) competition failure for an unlicensed frequency band reaches a second preset condition;
   initiating the random access to the base station in the preset manner when the LBT competition failure reaches the second preset condition;
   sending the first message set of the random access to the base station when the LBT competition failure does not reach the second preset condition and an LBT competition succeeds, and waiting for receiving the second message set of the random access sent by the base station.

2. The competitive random access method of claim 1, wherein the first preset condition is a first preset duration, and determining whether the overhead of waiting for the second message set reaches the first preset condition comprises:
   determining whether a duration of waiting for the second message set reaches the first preset duration.

3. The competitive random access method of claim 1, wherein the first preset condition is a first preset number, and determining whether the overhead of waiting for the second message set reaches the first preset condition comprises:
   determining whether a number of random access failures reaches the first preset number during waiting for the second message set.

4. The competitive random access method of claim 1, wherein the second preset condition is a second preset duration, and determining whether the LBT competition failure for the unlicensed frequency band reaches the second preset condition comprises:
   monitoring the unlicensed frequency band to determine whether a non-idle duration of the unlicensed frequency band reaches the second preset duration.

5. The competitive random access method of claim 1, wherein the second preset condition is a second preset number, and determining whether the LBT competition failure for the unlicensed frequency band reaches the second preset condition comprises:
   monitoring the unlicensed frequency band to determine whether a number of occurrences of monitoring that the unlicensed frequency band is not idle reaches the second preset number.

6. The competitive random access method of claim 1, wherein the first message set comprises at least one of:
   the first message of the random access;
   the third message of the random access; and
   other messages.

7. The competitive random access method of claim 1, wherein the second message set comprises at least one of:
   the second message of the random access;
   the fourth message of the random access; and
   other messages.

8. A competitive random access method applicable to a terminal, comprising:
   before sending a message of the random access to the base station, determining whether a listen before talk (LBT) competition failure for an unlicensed frequency band reaches a second preset condition;
   initiating random access to a base station in a preset manner when the LBT competition failure reaches the second preset condition;
   sending a first message set of the random access to the base station when the LBT competition failure does not reach the second preset condition and an LBT competition succeeds, and waiting for receiving a second message set of the random access sent by the base station;
   wherein the preset manner comprises: sending a first message of the random access to the base station; receiving a second message of the random access sent by the base station according to the first message; sending a third message of the random access to the base station according to the second message; and receiving a fourth message of the random access sent by the base station according to the third message.

9. The competitive random access method of claim 8, wherein the second preset condition is a second preset duration, and determining whether the LBT competition failure for the unlicensed frequency band reaches the second preset condition comprises:
   monitoring the unlicensed frequency band to determine whether a non-idle duration of the unlicensed frequency band reaches the second preset duration.

10. The competitive random access method of claim 8, wherein the second preset condition is a second preset number, and determining whether the LBT competition failure for the unlicensed frequency band reaches the second preset condition comprises:
    monitoring the unlicensed frequency band to determine whether a number of occurrences of monitoring that the unlicensed frequency band is not idle reaches the second preset number.

11. The competitive random access method of claim 8, wherein the first message set comprises at least one of:

the first message of the random access;
the third message of the random access; and
other messages.

12. The competitive random access method of claim 8, wherein the second message set comprises at least one of:
the second message of the random access;
the fourth message of the random access; and
other messages.

13. An electronic apparatus, comprising:
a processor; and
a memory for storing instructions executable by the processor;
wherein the processor is configured to implement steps in the competitive random access method, comprising:
after sending a first message set of random access to a base station, waiting for receiving a second message set of the random access sent by the base station;
determining whether an overhead of waiting for the second message set reaches a first preset condition;
initiating the random access to the base station in a preset manner when the overhead of waiting for the second message set reaches the first preset condition;
continuing waiting for the second message set when the overhead of waiting for the second message set does not reach the first preset condition;
wherein the preset manner comprises: sending a first message of the random access to the base station; receiving a second message of the random access sent by the base station according to the first message; sending a third message of the random access to the base station according to the second message; and receiving a fourth message of the random access sent by the base station according to the third message;
wherein the processor is configured to implement steps comprising:
before sending the first message set of the random access to the base station, determining whether a listen before talk (LBT) competition failure for an unlicensed frequency band reaches a second preset condition,
initiating the random access to the base station in the preset manner when the LBT competition failure reaches the second preset condition;
sending the first message set of the random access to the base station when the LBT competition failure does not reach the second preset condition and an LBT competition succeeds, and waiting for receiving the second message set of the random access sent by the base station.

14. The competitive random access method of claim 1, wherein the first preset condition is a first preset duration, and determining whether the overhead of waiting for the second message set reaches the first preset condition comprises:
determining whether a duration of waiting for the second message set reaches the first preset duration.

15. The competitive random access method of claim 1, wherein the first preset condition is a first preset number, and determining whether the overhead of waiting for the second message set reaches the first preset condition comprises:
determining whether a number of random access failures reaches the first preset number during waiting for the second message set.

16. The electronic apparatus of claim 13, wherein the first preset condition is a first preset duration, and determining whether the overhead of waiting for the second message set reaches the first preset condition comprises:
determining whether a duration of waiting for the second message set reaches the first preset duration.

17. The electronic apparatus of claim 13, wherein the first preset condition is a first preset number, and determining whether the overhead of waiting for the second message set reaches the first preset condition comprises:
determining whether a number of random access failures reaches the first preset number during waiting for the second message set.

18. An electronic apparatus, comprising:
a processor; and
a memory for storing instructions executable by the processor;
wherein the processor is configured to implement steps in the competitive random access method of claim 8.

* * * * *